United States Patent
Huang (10) Patent No.: US 7,574,359 B2
(45) Date of Patent: Aug. 11, 2009

(54) SPEAKER SELECTION TRAINING VIA A-POSTERIORI GAUSSIAN MIXTURE MODEL ANALYSIS, TRANSFORMATION, AND COMBINATION OF HIDDEN MARKOV MODELS

(75) Inventor: Chao Huang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 595 days.

(21) Appl. No.: 10/957,383

(22) Filed: Oct. 1, 2004

(65) Prior Publication Data

US 2006/0074657 A1   Apr. 6, 2006

(51) Int. Cl.
G10L 17/00   (2006.01)
G10L 15/06   (2006.01)
G10L 15/14   (2006.01)

(52) U.S. Cl. .................. 704/244; 704/248; 704/250; 704/256

(58) Field of Classification Search ......... 704/243–246, 704/256, 250
See application file for complete search history.

(56) References Cited

U.S. PATENT DOCUMENTS

| 6,073,096 A * | 6/2000 | Gao et al. ............... 704/245 |
| 6,697,778 B1 * | 2/2004 | Kuhn et al. .............. 704/243 |
| 2005/0021335 A1 * | 1/2005 | Chaudhari et al. ......... 704/243 |
| 2005/0251532 A1 * | 11/2005 | Radhakrishnan et al. . 707/104.1 |

OTHER PUBLICATIONS

Gao et al., Y., "Speaker Adaptation Based on Pre-Clustering Training Speakers", Proceedings of EuroSpeech '97, vol. 4, pp. 2091-2094, Sep. 1997.
Gales, M., "Cluster Adaptive Training of Hidden Markov Models", IEEE Transactions on Speech and Audio Processing, vol. 8, No. 4, pp. 417-428, Jul. 2000.
Hazen, T., "A comparison of novel techniques for rapid speaker adaptation", Speech Communication, vol. 31, pp. 15-33, 2000.
Huang et al., C., "Speaker Selection Training for Large Vocabulary Continuous Speech Recognition", Proceedings ICASSP2002, 2002.
Huang et al., C., "Adaptive Model Combination for Dynamic Speaker Selection Training", Proceedings ICSLP2002, vol. 1, pp. 65-68, 2002.
Kuhn et al., R., "Rapid Speaker Adaptation in Eigenvoice Space", IEEE Transactions on Speech and Audio Processing, vol. 8, No. 6, pp. 695-707, Nov. 2000.
Lee et al., C., "A Study on Speaker Adaptation of the Parameters of Continuous Density Hidden Markov Models", IEEE Transactions on Signal Processing, vol. 39, No. 4, pp. 806-814, Apr. 1991.

(Continued)

*Primary Examiner*—Richemond Dorvil
*Assistant Examiner*—Douglas C Godbold
(74) *Attorney, Agent, or Firm*—Westman, Champlin & Kelly, P.A.

(57) ABSTRACT

The present invention is directed to a 3-stage adaptation framework based on speaker selection training. First a subset of cohort speakers is selected for a test speaker. Then cohort models are transformed to be closer to the test speaker. Finally the adapted model for the test speaker is obtained by combining these transformed cohort models. Combination weights as well as bias items can be adaptively learned from adaptation data.

15 Claims, 6 Drawing Sheets

OTHER PUBLICATIONS

Leggetter et al., C., "Maximum likelihood linear regression for speaker adaptation of continuous density hidden Markov models", Computer Speech and Language, vol. 9, pp. 171-185, 1995.

Matrouf et al., D., "A Posteriori and a Priori Transformations for Speaker Adaptation in Large Vocabulary Speech Recognition Systems", Eurospeech 2001, vol. 2, pp. 1245-1248, 2001.

Padmanabhan et al., M., "Speaker Clustering and Transformation for Speaker Adaptation in Speech Recognition Systems", IEEE Transactions on Speech and Audio Processing, vol. 6, No. 1, Jan. 1998.

Yoshizawa et al., S., "Evaluation on Unsupervised Speaker Adaptation Based on Sufficient HMM Statistics of Selected Speakers", Eurospeech 2001, vol. 2, pp. 1219-1222, 2001.

Reynolds et al., D., "Robust Text-Independent Speaker Identification Using Gaussian Mixture Speaker Models", IEEE Transactions on Speech and Audio Processing, vol. 3, No. 1, pp. 72-83, Jan. 1995.

\* cited by examiner

SPEAKER SELECTION TRAINING VIA A-POSTERIORI GAUSSIAN MIXTURE MODEL ANALYSIS, TRANSFORMATION, AND COMBINATION OF HIDDEN MARKOV MODELS

BACKGROUND OF THE INVENTION

The present invention relates to speech recognition. In particular the present invention relates to speaker adaptation for speaker independent speech recognition.

Acoustic variance across speakers is one of the main challenges of speaker independent (SI) speech recognition systems. A large amount of research has been conducted on adapting a system to a particular speaker in an attempt to deal with this problem. Conventional hidden Markov model (HMM) adaptation methods used for speaker independent speech recognition can be divided into three families: linear transformation, Bayesian learning, and speaker space. One form of linear transformation is maximum likelihood linear regression (MLLR), as discussed in C. J. Leggetter, P. C. Woodland, "Maximum likelihood linear regression for speaker adaptation of continuous density hidden Markov models," Computer Speech and Language, vol. 9, pp. 171-185, 1995.; One form of Bayesian learning is maximum a posterior (MAP) learning, such as discussed in C.-H. Lee, C.-H. Lin and B.-H. Juang, "A study on speaker adaptation of the parameters of continuous density hidden Markov models," IEEE Transactions on Signal Processing, vol. 9, pp. 806-814, 1991 One form of speaker space adaptation involves using Eigenvoices, as discussed in R. Kuhn, J. C. Junqua, P. Nguyen and N. Niedzielski, "Rapid speaker adaptation in eigenvoice space," IEEE Transactions on Speech and Audio Processing, vol. 8, pp. 695-707, 2000. Depending on available data from a test speaker, adaptation algorithms usually estimate a limited number of parameters to obtain a precise description of the speaker.

Recently, a promising speaker-adaptation method, speaker selection training (SST), has emerged in the literature. See for example, D. Matrouf, O. Bellot, P. Nocera, G. Linares and J.-F. Bonastre, "A posteriori and a priori transformations for speaker adaptation in large vocabulary speech recognition systems," in Proc. Eurospeech2001, vol. 2, pp. 1245-1248; M. Padmanabhan, L. Bahl, D. Nahamoo and M. Picheny, "Speaker clustering and transformation for speaker adaptation in speech recognition systems," IEEE Transactions on Speech and Audio Processing, vol. 6, pp. 71-77, 1998; and S. Yoshizawa, A. Baba, K. Matsunami, Y. Mera, M. Yamada, A. Lee and K. Shikano, "Evaluation on unsupervised speaker adaptation based on sufficient HMM statistics of selected speakers," in Proc. Eurospeech2001, vol. 2, pp. 1219-1222, 2001. SST selects a subset of cohort speakers from a set of training speakers, and builds a speaker-adapted (SA) model based on these cohorts. In general, SST is a two-stage process: cohort speaker selection and model generation.

Speaker selection training can make efficient use of very limited adaptation data. For example, given one adaptation utterance of several seconds, MLLR or MAP can hardly achieve improvements. However, the data may be a good enough index to select acoustically similar speakers from a pool of training speakers. This is due to the fact that a minimal amount of data can achieve excellent accuracy on speaker recognition. See D. A. Reynolds and R. C. Rose, "Robust text-independent speaker identification using Gaussian mixture speaker models," IEEE Transactions on Speech and Audio Processing, vol. 3, pp. 72-83, 1995.

There are various practical implementations of SST. In the first stage, selecting cohorts, the key issue is to define a similarity measure. In M. Padmanabhan, L. Bahl, D. Nahamoo and M. Picheny, "Speaker clustering and transformation for speaker adaptation in speech recognition systems," IEEE Transactions on Speech and Audio Processing, vol. 6, pp. 71-77, 1998 ("Pandmanabhan"), adaptation data from a test speaker are fed to speaker adapted HMMs of all training speakers to calculate a likelihood score used as a similarity measure. In D. Matrouf, O. Bellot, P. Nocera, G. Linares and J.-F. Bonastre, "A posteriori and a priori transformations for speaker adaptation in large vocabulary speech recognition systems," in Proc. Eurospeech2001, vol. 2, pp. 1245-1248, ("Matrouf") and S. Yoshizawa, A. Baba, K. Matsunami, Y. Mera, M. Yamada, A. Lee and K. Shikano, "Evaluation on unsupervised speaker adaptation based on sufficient HMM statistics of selected speakers," in Proc. Eurospeech2001, vol. 2, pp. 1219-1222, 2001, ("Yoshizawa") likelihood scores from a Gaussian mixture model (GMM) are used instead.

In the second stage, model generation, there are various options, such as HMM retraining, MAP adaptation, data transformation and model combination. These are set out in the following references: Matrouf, Pandmanabhan, and Yoshizawa.

However, retraining a speaker independent model by using data from selected cohorts is very time-consuming. Model combination is much faster, because only pre-calculated statistics are used in techniques such as that in the Yoshizawa paper.

SUMMARY OF THE INVENTION

The present invention is directed to a 3-stage adaptation framework based on speaker selection training. First a subset of cohort speakers is selected for a test speaker. The cohorts are selected based on a relative similarity to the test speaker. The second stage is transforming the cohort speakers. The cohorts are transformed so that the models of the cohorts are closer to the test speaker. The third stage is to combine the cohort models. As each of the models has a different closeness based on the relative similarity to the test speaker, a weighting vector is calculated for each of the cohort models. The weight vectors as well as bias items can be adaptively learned from adaptation data. The combined model is then output as the model for the test speaker.

DETAILED DESCRIPTION OF ILLUSTRATIVE EMBODIMENTS

The present invention relates to speaker selection training or speaker adaptation for speaker independent speech recognition. Prior to describing the present invention in greater detail, one exemplary environment in which the invention can be used will be discussed.

Figure 1:
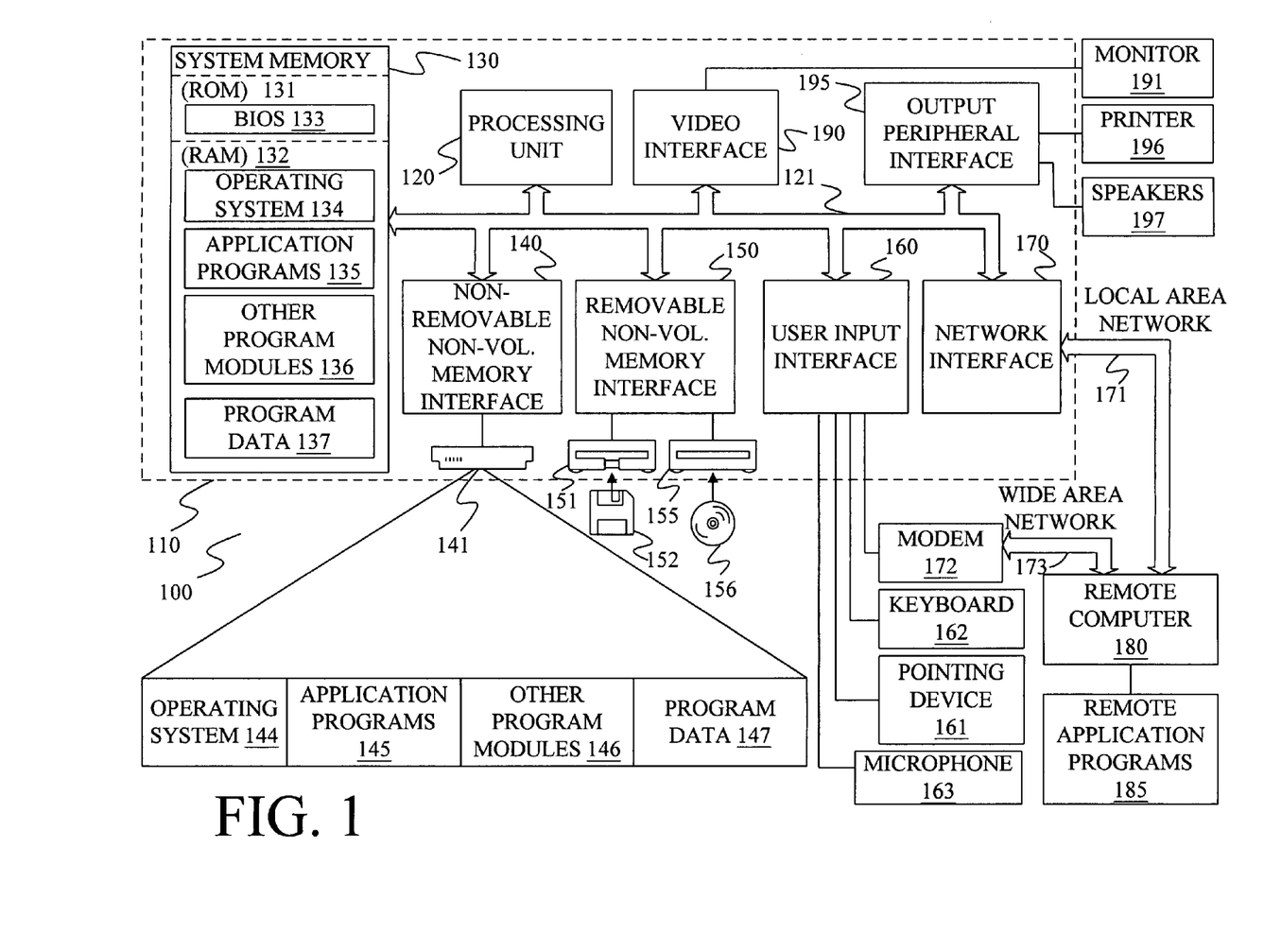
FIG. 1 is a block diagram of one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
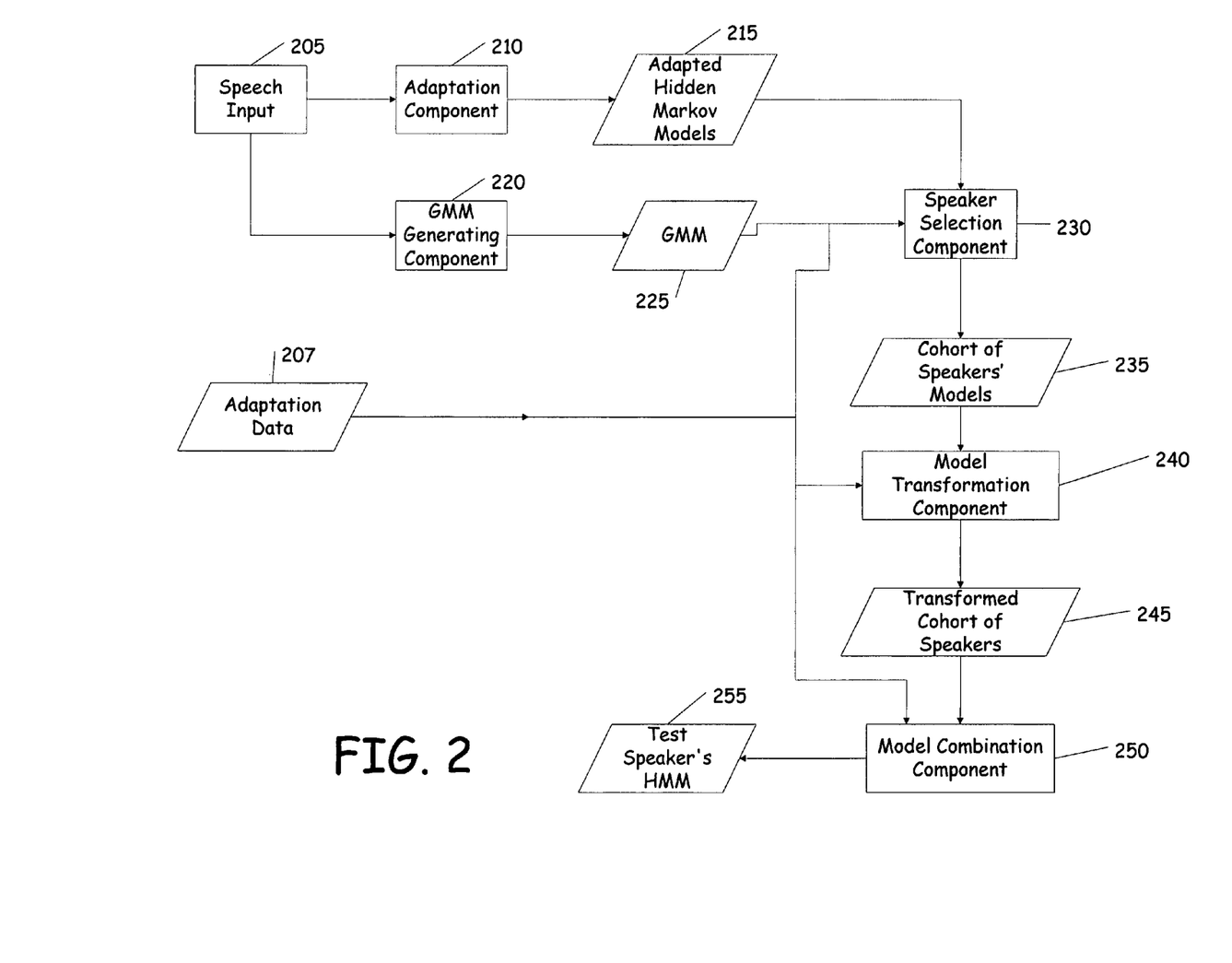
FIG. 2 is a block diagram illustrating the components of the system according to one embodiment of the present invention.

FIG. 2 is a block diagram illustrating, according to one embodiment of the present invention, the components of the three-stage adaptation framework system 200. The framework system 200 includes an adaptation component 210, a Gaussian Mixture Model (GMM) generating component 220, a speaker selection component 230, a model transformation component 240, and a model combination component 250.

Adaptation component 210 is configured to receive a speech input 205 that is generated from a plurality of training speakers. The training speakers are the speakers that were used to train the speech recognition system. In one embodiment the speech input 205 is representative of 250 speakers. However, any number of training speakers can be used.

The adaptation component 210 generates an adapted model for each training speaker from data using a known adaptation technique. In one embodiment the adaptation technique is the Maximum Likelihood Linear Regression (MLLR) algorithm of C. J. Leggetter, P. C. Woodland, "Maximum likelihood linear regression for speaker adaptation of continuous density hidden Markov models," Computer Speech and Language, vol. 9, pp. 171-185, 1995 ("Leggetter"). In this embodiment the output of the adaptation component 210 is an adapted HMM for each of the training speakers, and is represented in FIG. 2 as element 215.

GMM generating component 220 is configured to generate Gaussian Mixture Models for each of the training speakers. The GMM generating component 220 receives the speech input 205 indicative of speech data from the plurality of training speakers. The GMM generation component 220 then uses the speech input 205 to generate a GMM 225 for each of the training speakers.

Speaker selection component 230 is configured to select speakers based on their relative probabilities of matching the test speaker. The speaker selection component receives the Gaussian Mixture Models 225 for the training speakers (or the adapted HMMs 215 for the training speakers if cohort speakers are selected based on HMMs), and the adaptation data 207 from the test speaker. The speaker selection component 230 then calculates the probabilities that each speaker in the set of training speakers will match the test speaker. Those training speakers (or models of the training speaker) whose probabilities meet or exceed a threshold value are selected as the cohort speakers 235. As discussed below with regards to FIG. 4, the threshold can be a fixed number of speakers, a percentage of the training speakers, or any other desired threshold.

The model transformation component 240 transforms the models for the training speakers to more closely match the test speaker. It receives the cohort speakers' models 235 and the adaptation data 207 for the test speaker. In one embodiment the model transformation component transforms the models of the cohort speakers 235 to that of the test speaker using the MLLR transformation discussed in the Leggeter reference discussed in the Background. However, transformations based upon more compact models can also be used. These transformed models representing the transformed HMMs of the cohort speakers are output as element 245.

The model combination component 250 combines the transformed models 245 of the cohort speakers to more closely match that of the test speaker. The model combination component 250 combines each model within the set of cohort speakers using a weighting component that measures that model's relative contribution to the test speaker's model. The model combination component 250 also makes use of the adaptation data 207. The combination of the weighted models is output as the test speaker's HMMs 255.

Figure 3:
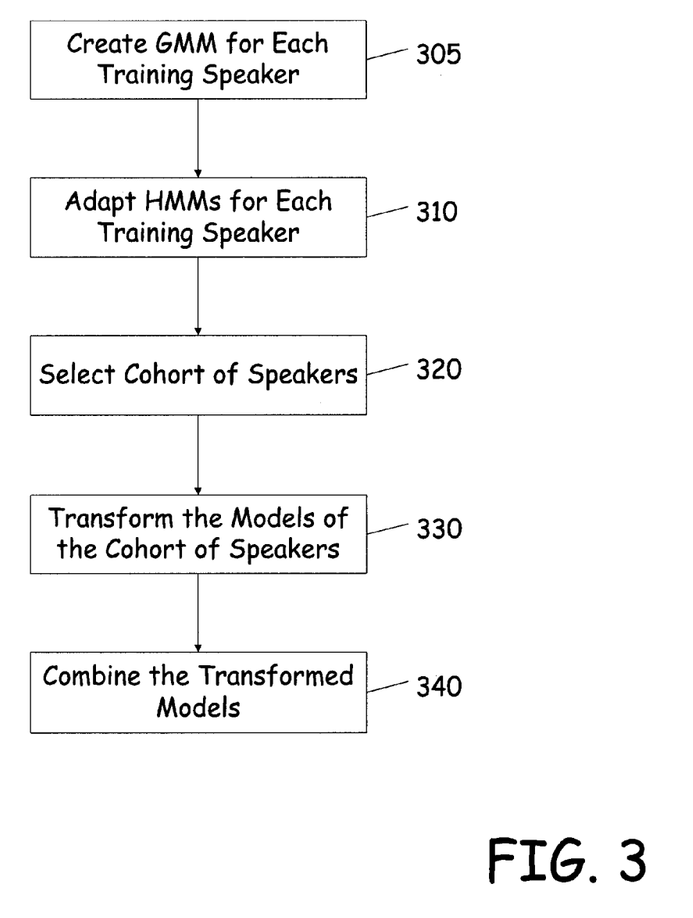
FIG. 3 is a flow diagram illustrating the steps executed by the system according to one embodiment of the present invention.

FIG. 3 is a flow diagram illustrating the steps executed by the 3-stage adaptation framework system 200 according to one embodiment of the present invention. Prior to starting the adaptation process a GMM is created for each training speaker. This is illustrated at step 305. Also Hidden Markov Models for each of the training speakers are adapted from a speaker independent system at the adaptation component 210 using MLLR. This is illustrated at step 310.

The first stage of the adaptation framework is to select a subset (set of cohorts) of the speakers who are acoustically close to the test speaker according to likelihood scores based on the GMM or HMM of the training speaker. This is illustrated at step 320. Next the selected speakers' models are transformed to match the test speaker better. This is illustrated at step 330.

In the third step of the adaptation framework the transformed models are linearly combined by, for example, interpolating Gaussian mean vectors, to form the speaker adapted model for the test speaker. This is illustrated at step 340. The interpolation weights can be estimated from the adaptation data. The concept of model combination is similar to reference-speaker weighting, cluster-adaptive training, and cluster weighting. However, these methods do not include speaker-specific subset selection.

Figure 4:
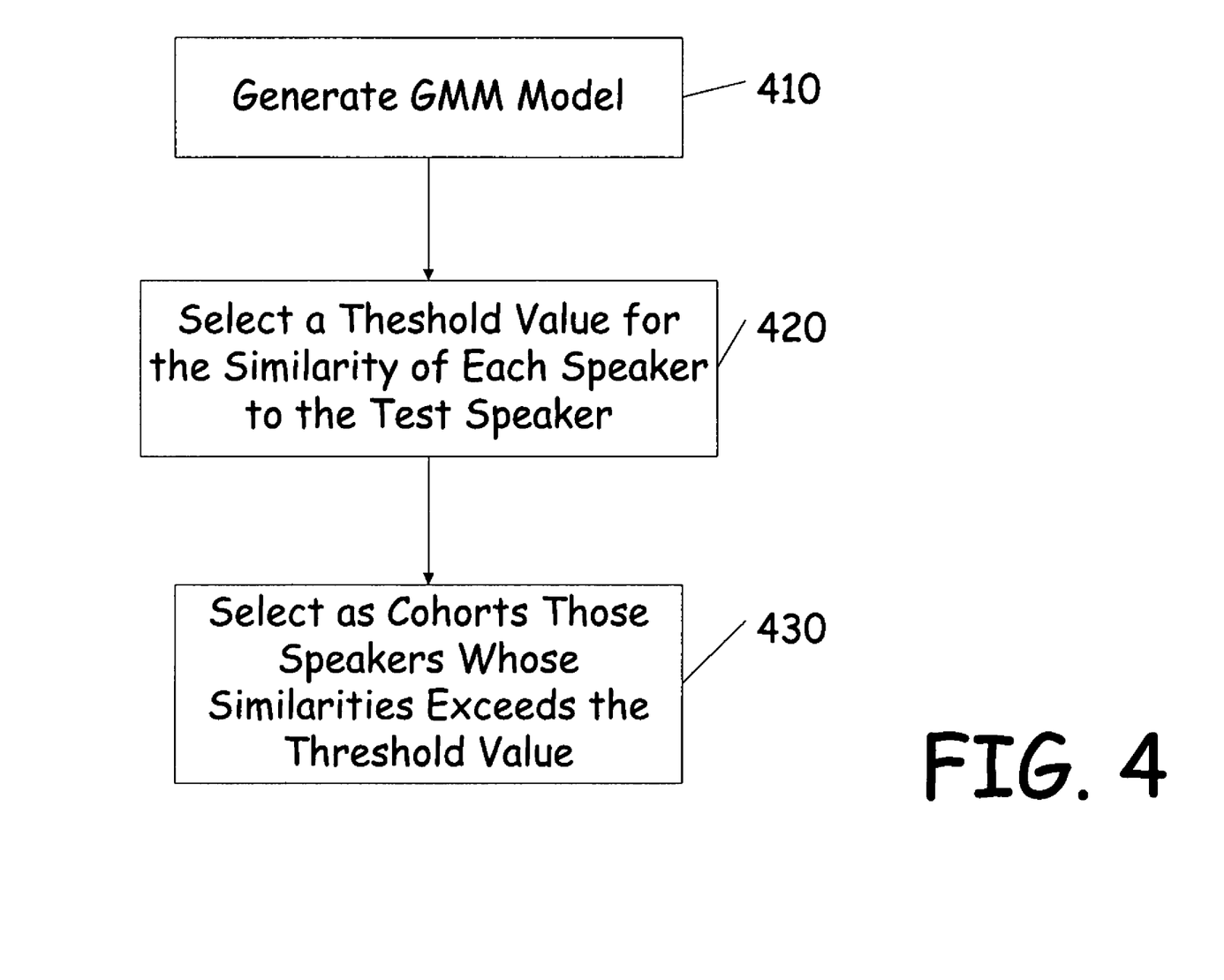
FIG. 4 is a flow diagram illustrating the steps executed by the speaker selection component according to one embodiment of the present invention.

FIG. 4 is a flow diagram illustrating the steps executed by the speaker selection component 230 according to one embodiment of the present invention. The steps illustrated in FIG. 4 correspond to step 320 in FIG. 3. This process finds a set of cohorts (group or cluster) from the training speakers whose speaking patterns are the closest to that of the test speaker.

The use of HMM based likelihood scores is consistent with the recognition stage and is widely used in some prior art systems. However, it has been observed that a Hidden Markov Model adapted with 200 utterances is not very reliable when selecting cohort speakers. The reason is that HMMs focus more on modeling the probability distribution of phonemes instead of speakers. In contrast, Gaussian Mixture Models (GMMs) have been successfully used in state-of-the-art speaker recognition systems. In other words, GMMs are a more efficient means for representing the characteristics of a speaker. The present invention thus uses a GMM to model each training speaker according to the following equation:

$$b(O) = \sum_{k=1}^{M} c_k G(O, \mu_k, U_k) \quad \text{Equation (1)}$$

For purposes this discussion the following notation is used: capital bold letters refer to matrices, e.g., M; bold letters refer to vectors, e.g., μ; and scalars are not bold, e.g., m. In equation (1), b(O) is the output probability of observation sequence O, M is the number of mixture components, $c_k$ is the weight for k-th mixture component, G is a Gaussian function with mean vector $\mu_k$ and covariance matrix $U_k$. In one embodiment, a diagonal covariance matrix is used and is referred to as vector $\sigma_k^2$. This process is illustrated at step 410.

To generate models, the probability mixture component is calculated. Given a certain amount of data, the posterior probability for mixture component k is given by the following equation:

$$p(k \mid o(t), \Lambda_n) = \frac{c_k G(o(t), \mu_k, \sigma_k^2)}{\sum_{i=1}^{M} c_i G(o(t), \mu_i, \sigma_i^2)} \quad \text{Equation (2)}$$

An expectation-maximization (EM) re-estimation process for generating the Gaussian Mixture Models for the speakers can be performed according to a known process. In one embodiment, the EM re-estimation formulae for the GMMs can be that set out in D. A. Reynolds and R. C. Rose, "Robust text-independent speaker identification using Gaussian mixture speaker models," IEEE Transactions on Speech and Audio Processing, vol. 3, pp. 72-83, 1995.

The present invention then sets a threshold similarity value and selects as cohorts those training speakers that have models sufficiently similar to the test speaker's model. In one embodiment, a test speaker's adaptation data is fed to all GMMs to calculate the likelihoods. When selecting the cohorts, the present invention selects those speakers whose likelihood exceeded a certain threshold value. For instance, the training speakers with the K largest likelihood scores are selected as cohorts. In another embodiment, the training speakers having a likelihood scores in the top 10% of the speakers are selected as cohorts. However, other values can be used for the threshold value. For example, the top "x" (where x is a number of speakers, e.g. 10, or 20) speakers can be chosen, or those speakers whose probability exceeds 90%. The selecting of a threshold similarity value is illustrated at step 420, and the selection of the cohorts is illustrated at step 430.

Figure 5:
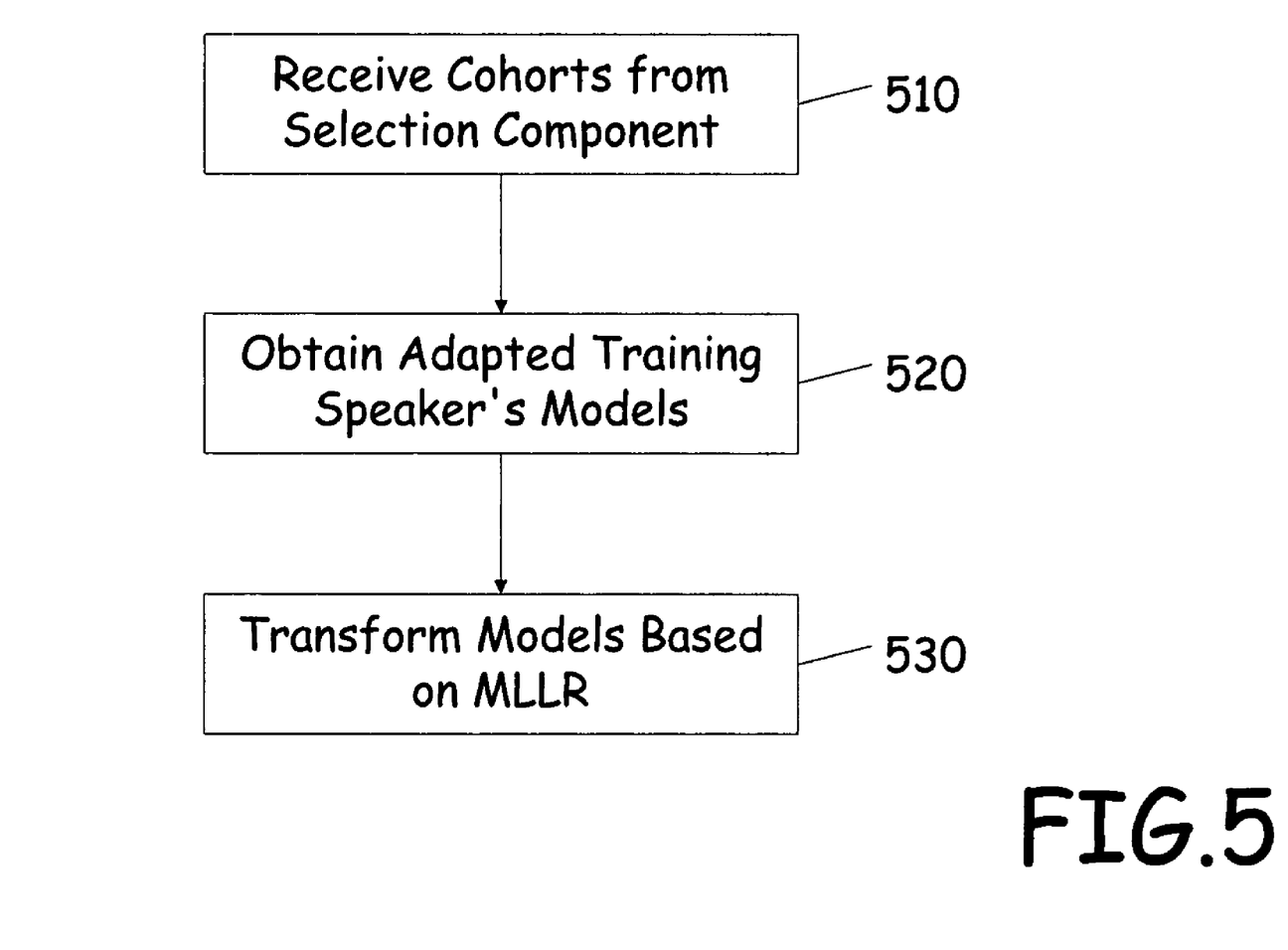
FIG. 5 is a flow diagram illustrating the steps executed by the model transformation component according to one embodiment of the present invention.

The cohort models are then transformed to more closely resemble the test speaker. FIG. 5 is a flow diagram illustrating the steps executed by the model transformation component 240 when transforming the models, according to one embodiment of the present invention. After the cohorts are selected in step 320 of FIG. 3, the information related to the models of the cohorts can be used for speaker adaptation in several ways. For example, adaptation can be accomplished by retraining the speaker independent model with the data from the cohorts, or by combining speaker adapted models of the cohorts with pre-calculated statistics, or by other adaptation techniques or combinations thereof. The receipt of the cohorts from the selection component 230 is illustrated at step 510.

The present invention performs adaptations by using the statistics of the cohorts at the model level. In one embodiment, the training speakers' initial models are generated from the speaker independent model, off-line, in advance. Specifically, each training speaker's initial model is adapted from the speaker independent system using the MLLR algorithm. This step is illustrated at step 520. However, in alternative embodiments the models can be calculated at run time.

The adaptation results generated by the present invention depend on the relative distribution between training and test speakers. Thus, if the test speaker is "far" from all training speakers, the characteristics of selected cohorts will not match those of the test speaker. Therefore, directly combining these dissimilar models is not the best solution. Consequently, before the models are combined, it may be desirable to transform the cohorts' models based on the test speaker. This reduces the difference between the data from cohort speakers and that from the test speaker, making them more similar. For purposes of simplicity, in one embodiment, this transformation is based on MLLR. This is illustrated at step 530. However, for better performance, a combination procedure based on more compact models can be used.

Figure 6:
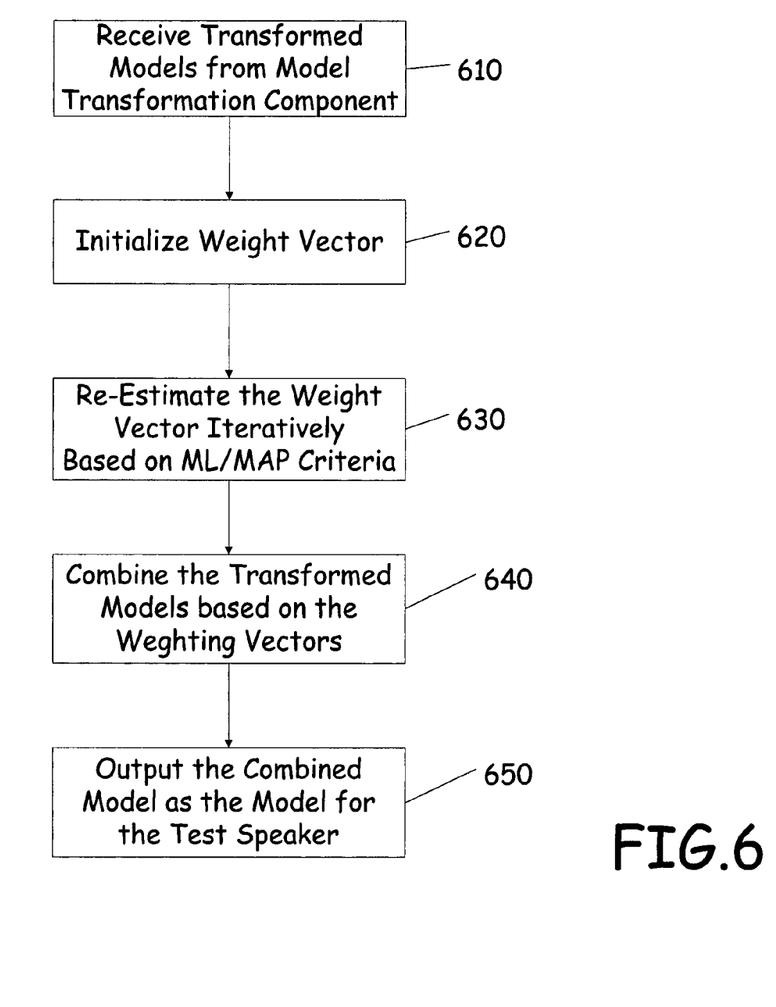
FIG. 6 is a flow diagram illustrating the steps executed by the model combination component according to one embodiment of the present invention.

FIG. 6 is a flow diagram illustrating the steps executed by the model combination component 250 when combining the cohort models according to one embodiment of the present invention. After selecting the cohort speakers and transforming their models according to the test speaker data, the resultant cohort model more closely approaches models for the test speaker. However, since each cohort model doesn't match the target (the test speaker) equally well, it is necessary to combine the cohort models with different weights to measure their relative contribution to the ultimate test speaker's model. The transformed models are received at step 610.

For purposes of this discussion it is assumed that there are R selected cohorts. Each cohort is associated with a transformed cohort model. For purposes of simplicity, a global weight vector can be learned for all phoneme classes of test speakers. However, in one embodiment of the present invention, different weight vectors for different phone classes are estimated using a regression tree. This is illustrated at step 620. For a particular Gaussian component, m, the mean vector for the test speaker, $\mu^m$, is given by the following equation:

$$\mu^m = M_m \lambda \quad \text{Equation (3)}$$

where $M_m$ is the matrix formed by R cohort mean vectors for component m. And λ is the weight vector given by the following equation:

$$\lambda = [\lambda_1, \ldots, \lambda_R]^T \quad \text{Equation (4)}$$

Here λ can be set according to the prior information with the following equation:

$$\bar{\lambda}_r = \frac{\sum_{m=1}^{M} \sum_{t=1}^{T} \gamma_m(t,r)}{\sum_{r=1}^{R} \sum_{m=1}^{M} \sum_{t=1}^{T} \gamma_m(t,r)}, r = 1, \ldots, R \quad \text{Equation (5)}$$

where $\gamma_m(t,r)$ is the posterior probability of Gaussian m in cohort model r at time t.

The weight vector λ can also be learned through Maximum likelihood (ML) or Maximum a-posterior (MAP) criteria by maximizing the likelihood or posterior probability of adaptation data from the test speaker given the combined model. This learning of the weight vector can be represented by optimizing the following equation:

$$\underset{\lambda}{\operatorname{argmax}} \left\{ \sum_{m=1}^{M} \sum_{t=1}^{T} \log p(o(t)|\lambda) + \log p(\lambda) \right\} \quad \text{Equation (6)}$$

where $p(o(t)|\lambda)$ is the probability of the observation vector at time t given the weight vector λ.

Like MLLR adaptation and cluster weighting, a bias item can be introduced to consider the effect of channel condition. This is represented by the following equation:

$$\mu^m = M_m \lambda + b = M'_m \lambda' \quad \text{Equation (7)}$$

A detailed deduction and solution for the weight vector can be found in the paper of C.-H. Lee, C.-H. Lin and B.-H. Juang, discussed in the Background, the contents of which are incorporated by reference in their entirety.

In implementation, this learning process can iterate more than once. After each iteration, the adaptation statistics can be more accurately estimated with a new speaker adapted model. Following each iteration, the present invention illustratively re-estimates the weight vector. This is illustrated at step 630.

In a technique referred to as reference-speaker weighting (and set out in the Huang, Chen and Chang reference discussed above), two constraints are added to maximize the goal function, and are represented by the following equation:

$$\forall r, \quad \lambda_r \geq 0 \text{ and } \sum_{r=1}^{R} \lambda_r = 1 \quad \text{Equation (8)}$$

The cluster-adaptive training proposed by Gales (discussed above with respect to cluster adaptive training) does not apply these constraints. However, the speaker independent model of the present invention is considered as a cluster and the corresponding weight is therefore assigned to 1. Both the constraints and incorporating speaker independent model are aimed to achieve robust estimation. In the present invention, as acoustically close speakers are pre-selected, the prior information contained in $\bar{\lambda}$ and $\Sigma\lambda$ is used to enhance the reliability of learning weight vector(s).

Following the determination of the weighting vectors the transformed models are combined using a known combination process, and using the weights determined for each transformed cohort model. This is illustrated at step 640. The combined models are then output to the speech recognizer as the model for the test speaker. This is illustrated at step 650.

Although the present invention has been described with reference to particular embodiments, workers skilled in the art will recognize that changes may be made in form and detail without departing from the spirit and scope of the invention.

What is claimed is:

1. A computer-implemented method of transforming and combining a plurality of models representing training speakers into a model for a test speaker, comprising:

receiving adaptation data from the test speaker;

utilizing a computer processor that is a functional component of the computer to select a set of cohort speakers from the training speakers;

transforming a plurality of models representing the cohort speakers; and combining the plurality of transformed models to form the model for the test speaker;

wherein selecting a set of cohort speakers comprises:

generating a Gaussian Mixture Model (GMM) for each of the training speakers in the plurality of training speakers, wherein generating the GMM for each of the training speakers comprises calculating a probability mixture component for each GMM, wherein the Gaussian Mixture Models are calculated according to the following equation:

$$b(O) = \sum_{k=1}^{M} c_k G(O, \mu_k, U_k);$$

where b(O) is an output probability of observation sequence O, $c_k$ is a weight for k-th mixture component, G is a Gaussian function with mean vector $\mu_k$ and convariance matrix $U_k$, and wherein the probability mixture component is calculated according to the following equation:

$$p(k|o(t), \Lambda_n) = \frac{c_k G(o(t), \mu_k, \sigma_k^2)}{\sum_{i=1}^{M} c_i G(o(t), \mu_i, \sigma_i^2)};$$

where $p(k|O(t),\Lambda_n)$ is a posterior probability for mixture component k and weight vector $\Lambda_n$, $c_k$ is a weight for k-th mixture component, and G is a Gaussian function with observation vector O(t) at time t, mean vector $\mu_k$ and diagonal covariance matrix $\sigma^2_i$;

determining a similarity between the models for the training speakers and the adaptation data from the test speaker based at least in part on the Gaussian Mixture Models and the probability mixture components; and selecting as a set of cohort speakers, training speakers that have models having a desired similarity to the adaptation data from the test speaker;

wherein transforming the plurality of models representing the cohort speakers comprises:

receiving model data for each of the models representing the cohort speakers; and adapting the model data for each of the models representing the cohort speakers based on the adaptation data from the test speaker, wherein the model data for each of the models representing the cohort speakers is adapted independently from one another; and wherein combining the plurality of transformed models comprises:

determining a weight vector for each of the transformed models, the weight vector for each of the transformed models being based at least partially on the adaptation data from the test speaker; and combining the plurality of transformed models based on the weight vectors to form the model for the test speaker.

2. The method of claim 1 wherein the consecutive order of the steps is first receiving, second selecting, third transforming, and fourth combining.

3. The method of claim 1 wherein determining a similarity comprises:

providing adaptation data for the test speaker to each of the Gaussian Mixture Models for the training speakers; and calculating a probability likelihood for each GMM given the adaptation data for the test speaker.

4. The method of claim 3 wherein adapting the model data of the cohort speakers is performed using a Maximum Likelihood Linear Regression (MLLR).

5. The method of claim 4 wherein determining the weight vector is determined using a regression tree.

6. The method of claim 4 wherein determining the weight vector is determined according to the following equation:

$$\overline{\lambda}_r = \frac{\sum_{m=1}^{M} \sum_{t=1}^{T} \gamma_m(t, r)}{\sum_{r=1}^{R} \sum_{m=1}^{M} \sum_{t=1}^{T} \gamma_m(t, r)}, r = 1, \ldots, R;$$

where $\overline{\lambda}_r$ is the weight, and $\gamma_m(t, r)$ $\gamma_m(t, r)$ is a posterior probability of Gaussian m in cohort model r at time t.

7. The method of claim 4 wherein the weight vector $\gamma$ is determined according to the following equation:

$$\underset{\lambda}{\operatorname{argmax}} \left\{ \sum_{m=1}^{M} \sum_{t=1}^{T} \log p(o(t)|\lambda) + \log p(\lambda) \right\};$$

wherein p represents a probability of an argument, M is a number of mixture components and o(t) is the observation vector at time t.

8. A system that generates a speaker adapted speech recognition model for a test speaker from a speaker independent speech recognition model, the system comprising:

a memory; and a processor implementing:

an adaptation component that receives a speech input that is generated from a plurality of training speakers, wherein the plurality of training speakers were used to train the speaker independent speech recognition model and wherein the adaptation component generates an adapted Hidden Markov Model for each of the plurality of training speakers from the speaker independent speech recognition model utilizing a Maximum Likelihood Linear Regression algorithm;

a Gaussian Mixture Model (GMM) generating component that receives the speech input generated from the plurality of training speakers, and that generates a speaker dependent Gaussian Mixture Model for each of the training speakers;

a speaker selection component that receives adaptation data from the test speaker and the Gaussian Mixture Model for each of the training speakers, wherein the speaker selection component calculates a probability of each of the training speakers matching the test speaker, wherein the speaker selection component selects at least two of the training speakers as cohort speakers based at least in part on the probabilities of the at least two exceeding a threshold value;

a model transformation component that receives the adapted Hidden Markov Model for each of the cohort speakers and the adaptation data from test speaker, wherein the model transformation component mathematically changes the adapted Hidden Markov Models for the cohort speakers to more closely match the test speaker; and a model combination component that combines the transformed adapted Hidden Markov Models of the cohort speakers to more closely resemble characteristics of the test speaker, wherein the model combination component determines a weighting component for each of the transformed models based at least in part on the adaptation data from the test speaker, wherein the model combination component combines the transformed models based upon the determined weighting components to form a speaker adapted Hidden Markov Model for the speaker.

9. The system of claim 8 wherein the model transformation component mathematically changes the adapted Hidden Markov Models for the cohort speakers using Maximum Likelihood Linear Regression (MLLR).

10. The system of claim 9 wherein the model combination component determines the weighting component for each of the transformed adapted Hidden Markov Model of the cohort speakers based upon a similarity each of the transformed models to the test speaker.

11. The system of claim 10 wherein the model combination component adaptively learns the weighting component for at least one of the transformed models.

12. The system of claim 11 wherein the model combination component adaptively learns a bias item.

13. A computer-implemented method of generating a test speaker Hidden Markov Model, the method comprising:

receiving test speaker adaptation data from a test speaker;

generating a plurality of training speaker Hidden Markov Models from a speaker independent speech recognition model;

selecting a set of cohort speaker Hidden Markov Models from the plurality of training speaker Hidden Markov Models, wherein the selection is based at least in part on a similarity of the test speaker adaptation data to each of the plurality of training speaker Hidden Markov Models and wherein the selection is performed at least in part by a computer processor that is a functional component of the computer;

transforming each of the selected cohort speaker Hidden Markov Models, wherein each of the selected cohort speaker Hidden Markov Models is transformed independently from one another and wherein transforming is based at least partially upon the test speaker adaptation data;

determining a weighting vector for each of the transformed cohort speaker Hidden Markov Models, wherein the weighting vector is based at least partially upon a comparison of the test speaker adaptation data and the transformed cohort speaker Hidden Markov Models; and combining each of the transformed cohort speaker Hidden Markov Models to generate the test speaker Hidden Markov Model, wherein combining is based at least partially upon the weighting vector for each of the transformed cohort speaker Hidden Markov Models, wherein the weighting vector for each of the transformed cohort speaker Hidden Markov Models is a measure of that model's relative contribution to the test speaker Hidden Markov Model, wherein at least one of the weighting vectors is determined through an iterative process, and wherein the transformed cohort speaker Hidden Markov Models are linearly combined by interpolating Gaussian mean vectors.

14. The method of claim 13 wherein the plurality of training speaker Hidden Markov Models are generated off-line, in advance.

15. The method of claim 13 wherein the plurality of training speaker Hidden Markov Models are generated at run time.

* * * * *